(12) United States Patent
Qian et al.

(10) Patent No.: US 7,804,766 B2
(45) Date of Patent: Sep. 28, 2010

(54) DEVICES, SYSTEMS, AND/OR METHODS REGARDING VIRTUAL ROUTING FORWARDING

(75) Inventors: Zhiqiang Qian, Holmdel, NJ (US);
Paritosh Bajpay, Edison, NJ (US);
Moigan Dardashti, Holmdel, NJ (US);
Jackson Liu, Middletown, NJ (US);
Michael Zinnikas, North Brunswi, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 329 days.

(21) Appl. No.: 11/941,381

(22) Filed: Nov. 16, 2007

(65) Prior Publication Data
US 2009/0129260 A1    May 21, 2009

(51) Int. Cl.
*H04J 1/16* (2006.01)

(52) U.S. Cl. ...................................... 370/216

(58) Field of Classification Search .............. 370/216, 370/219, 217, 220, 221, 225, 227, 228, 389, 370/392, 242, 251, 253, 408, 400, 401, 395.3, 370/395.53, 395.31, 395.4; 709/224; 714/4
See application file for complete search history.

(56) References Cited

U.S. PATENT DOCUMENTS

| | | | |
|---|---|---|---|
| 7,043,661 B2 * | 5/2006 | Valadarsky et al. | 714/4 |
| 7,551,551 B2 * | 6/2009 | Filsfils et al. | 370/219 |
| 7,570,580 B1 * | 8/2009 | Bajpay et al. | 370/216 |
| 2002/0145981 A1 | 10/2002 | Klinker | |
| 2006/0050653 A1 | 3/2006 | Guichard | |
| 2006/0227765 A1 | 10/2006 | Cao | |
| 2006/0294211 A1 | 12/2006 | Amato | |
| 2007/0180105 A1 | 8/2007 | Filsfils | |

* cited by examiner

*Primary Examiner*—Chi H Pham
*Assistant Examiner*—Alexander Boakye
(74) *Attorney, Agent, or Firm*—Hanley, Flight & Zimmerman, LLC (57) ABSTRACT

Certain exemplary embodiments can provide a method that can comprise automatically rendering information indicative of a cause of a failure in a Virtual Private Network (VPN) that comprises one or more routers that utilize Virtual Routing and Forwarding (VRF) tables to route traffic via the VPN. The cause of the failure can be automatically determined.

19 Claims, 6 Drawing Sheets

DEVICES, SYSTEMS, AND/OR METHODS REGARDING VIRTUAL ROUTING FORWARDING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method that can comprise automatically rendering information indicative of a cause of a failure in a Virtual Private Network (VPN) that comprises one or more routers that utilize Virtual Routing and Forwarding (VRF) tables to route traffic via the VPN. The cause of the failure can be automatically determined.

Certain exemplary networking systems can implement Virtual Routing and Forwarding ("VRF"). Routers that are adapted to utilize VRF can be adapted to store one or more VRF tables. Good data quality and service delivery can be desirable in networks utilizing VRF. Certain exemplary embodiments can be adapted to automatically troubleshoot problems related to VRF routing and/or the VRF Protocol and to attempt to reduce downtime in case of a VRF routing failure.

The VRF routing failure can cause customers to lose service. Troubleshooting can begin via an analysis of network facilities operating substantially at Layer one of the Open Systems Interconnection (OSI) reference model (e.g., Synchronous Optical Network), network facilities operating substantially at Layer two of the OSI reference model (e.g., Asynchronous Transfer Mode), and/or network facilities operating substantially at Layer three of the OSI reference model (e.g., Internet Protocol). Since VRF routing failure can be caused by exceeding a maximum route limit, a technician might not be able to locate the root cause via testing Layer one, Layer two, and/or Layer three facilities. The technicians might interact with a customer to identify a cause of the failure or receive information from the customer to identify the cause of the failure. Certain exemplary embodiments can be adapted to attempt to improve a time to identify and/or repair the failure.

Figure 1:
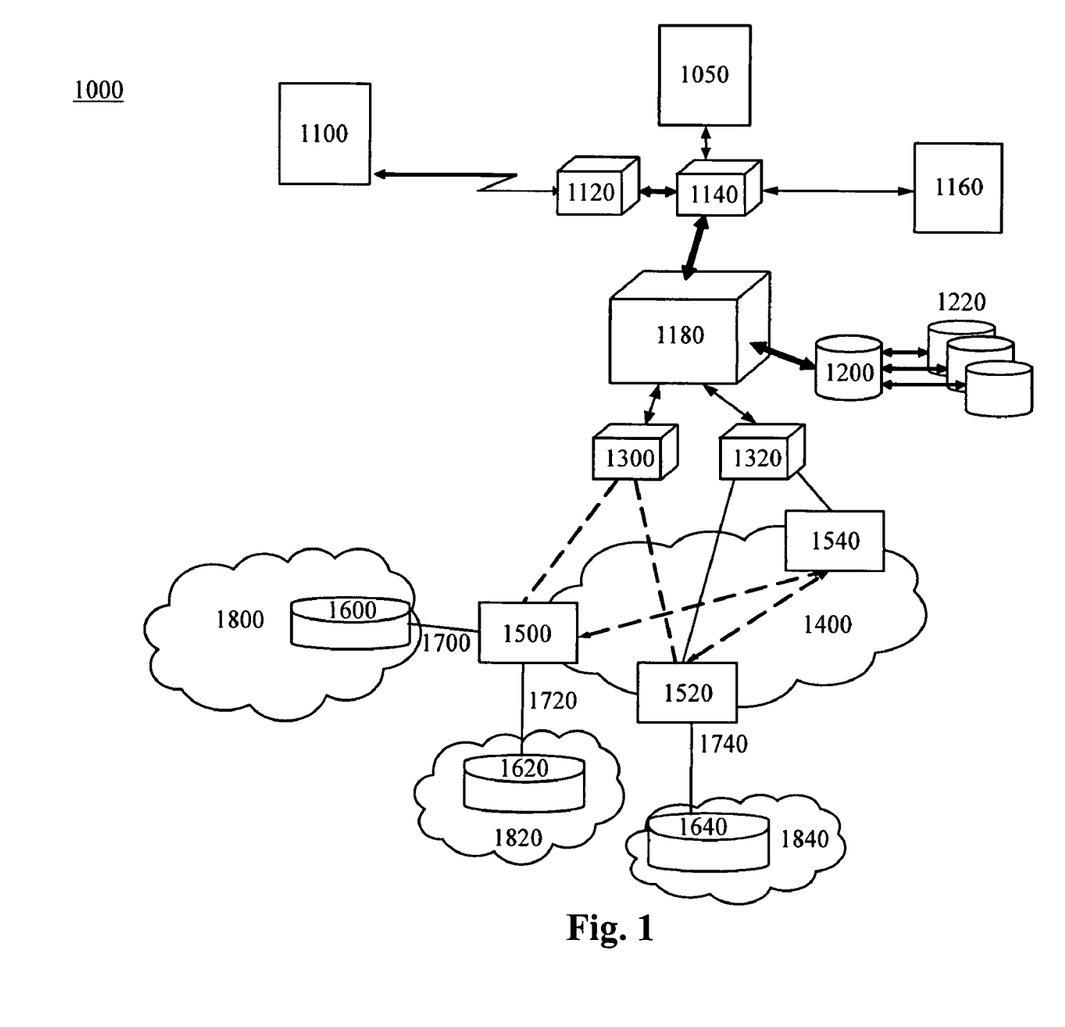
FIG. 1 is a block diagram of an exemplary embodiment of a system 1000.

FIG. 1 is a block diagram of an exemplary embodiment of a system 1000, which can comprise an interactive voice service 1120. Interactive voice service 1120 can comprise managed and/or network-based features that can provide a wide range of voice applications designed to help automate call center interactions. A first customer entity 1100 can communicate with one or more manual and/or automated entities via interactive voice service 1120. A second customer entity 1050 can be communicatively coupled to a One Ticketing Service (OTS)/Business Maintenance Platform (BMP) 1140, which can be adapted to perform activities, which can comprise integrated trouble ticketing, reporting, and/or diagnostic activities. OTS/BMP 1140 can comprise an e-bonding tool used by a customer care platform. Web users of OTS/BMP 1140 can obtain services, which can comprise Frame Relay (FR), Global Enterprise Networking Infrastructure (GENI), Internet Protocol (IP) Management Information System (MIS), Common Backbone (CBB), Voice, Nodal, Local Network Services (LNS), and/or Private Line services. Legacy components of OTS/BMP 1140 can comprise Managed Object (MO), Ticket, Test, and/or Alarm services. OTS/BMP 1140 can be communicatively coupled to a customer service entity 1160, which can be a workcenter. Customer service entity 1160 can receive information directly and/or indirectly from first customer entity 1100 and/or second customer entity 1150 regarding performance of one or more telecommunications services provided by a service provider.

OTS/BMP 1140 can be communicatively coupled to an expert system 1180, which can be adapted to analyze and/or troubleshoot conditions related to a network 1400. For example, expert system 1180 can be adapted to automatically detect and/or diagnose failures and/or other problems associated with VRF services in network 1400, which can be a backbone network. Expert system 1180 can utilize a plurality of heuristic rules and/or relationships to automatically detect and/or diagnose failures and/or other problems associated with VRF services in network 1400. For example, expert system 1180 can be adapted to store and/or reference a plurality of cause and effect relationships related to network 1400. Expert system 1180 can be adapted to perform any combination and/or sub-combination of activities comprised by method 3000 and/or method 4000. Expert system 1180 can be communicatively coupled to a database storage system 1200, which can be communicatively coupled to a plurality of database storage devices 1220. Each of database 1200 and/or database storage devices 1220 can be adapted to store information regarding network 1400 and/or heuristic rules associated with expert system 1180.

Expert system 1180 can be communicatively coupled to a Common Test Platform (CTP) 1300 and/or a Global Fault Platform (GFP) 1320. Each of CTP 1300 and GFP 1320 can be adapted to monitor network 1400 and/or interactions of network 1400 with a first customer network 1800, a second customer network 1820, and/or a third customer network 1840. CTP 1300 can be adapted to transmit and/or receive one or more signals to a first Provider Edge (PE) router 1500 and/or a second PE router 1520, such as packet internet groper (ping) signals. GFP 1320 can be adapted to receive fault information from one or more devices communicatively coupled to network 1400, such as second PE router 1520 and/or a third PE router 1540. First PE router 1500 can be communicatively coupled to a first customer edge (CE) router 1600 of first customer network 1800 via a first VRF link 1700. First PE router 1500 can be communicatively coupled to a second customer edge (CE) router 1620 of second customer network 1820 via a second VRF link 1720. Second PE router 1520 can be communicatively coupled to a third customer edge (CE) router 1620 of third customer network 1840 via a third VRF link 1740. Each of CTP 1300 and GFP 1320 can be adapted to receive and/or obtain information regarding first VRF link 1700, second VRF link 1720, and/or third VRF link 1740.

Figure 2:
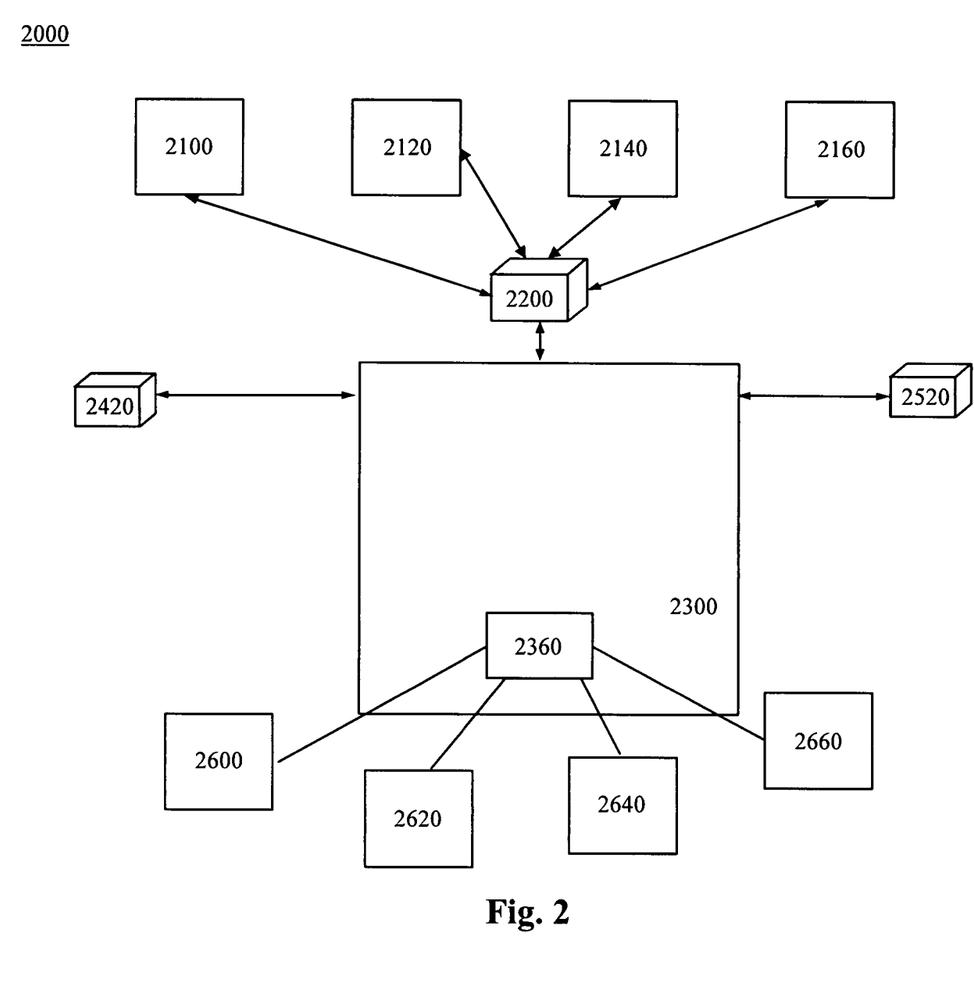
FIG. 2 is a block diagram of an exemplary embodiment of a system 2000.

FIG. 2 is a block diagram of an exemplary embodiment of a system 2000, which can comprise an OTS/BMP 2200. OTS/BMP 2200 can be adapted to receive from and/or provide information to a first customer 2100, a second customer 2120 a trouble ticket generation sub-system 2140, and/or a customer service entity 2160. OTS/BMP 2200 can be adapted to exchange information with an expert system 2300. Expert system 2300 can comprise a VRF analysis sub-system 2360, via which expert system 2300 can detect, diagnose, and or report problems associated with a VRF system. For example, expert system 2300 can be adapted to obtain and/or request information from a database sub-system 2420, which can comprise Border Gateway Protocol (BGP) information associated with the VRF system. Expert system 2300 can be adapted to obtain and/or request information from a GFP 2520, which can comprise network outage information associated with the VRF system.

VRF analysis subsystem 2360 can be adapted to exchange information with a first VRF customer 2600, a second VRF customer 2620, a VRF customer service entity 2640, and/or a local exchange carrier 2660, such as information regarding detected and/or diagnosed failures associate with the VRF system.

Figure 3:
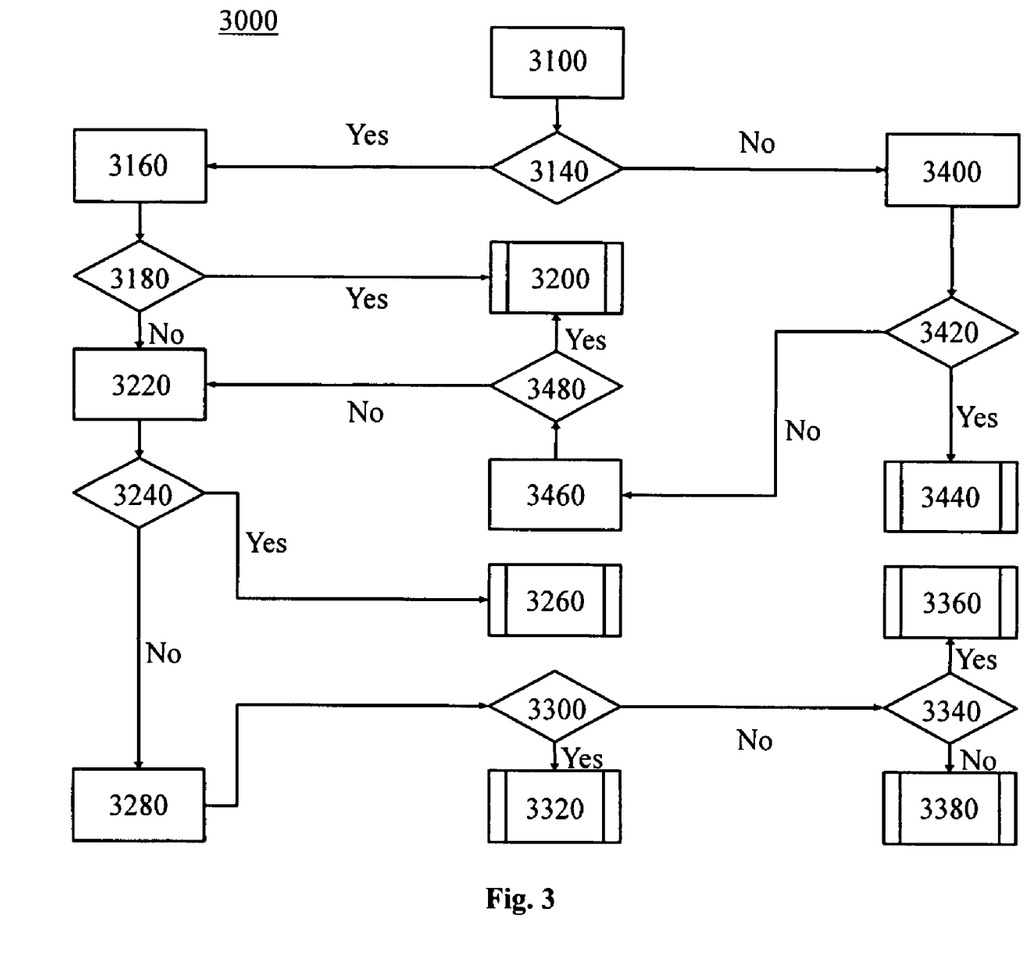
FIG. 3 is a flowchart of an exemplary embodiment of a method 3000.

FIG. 3 is a flowchart of an exemplary embodiment of a method 3000. At activity 3100, a VRF link down trap can be checked. Certain exemplary embodiments can be adapted to automatically analyze VRF traps including Multi-Protocol Label Switching (MPLS) VRF Link Up alerts and MPLS VRF Link Down alerts. Automatically filter out the problem related to Layer one and/or Layer two facilities.

At activity 3140, a determination can be made regarding whether a VRF link is out of service. If the VRF link is out of service, activity 3160 can be performed. If the VRF link is not out of service, activity 3400 can be performed. At activity 3160, information regarding a layer three port status can be obtained. The layer three port status can be associated with the VRF link.

At activity 3180, a determination can be made regarding whether the layer three port is out of service. If the layer three port is out of service, activity 3200 can be performed. If the layer three port is not out of service, activity 3220 can be performed. At activity 3200, a layer three problem can be automatically correlated to a layer one facility. For example, certain exemplary embodiments can be adapted to automatically correlate VRF threshold alerts to customer edge routers. At activity 3220, a VRF name from a router can be compared to a VRF name from an inventory system for each VRF link. Certain exemplary embodiments can be adapted to automatically compare a VRF Name from the router with that of an inventory database. If multiple VRFs are found on a Common Language Circuit Identifier (CLCI), any, some, and/or all of the VRFs can be compared to information in the inventory system.

At activity 3240, a determination can be made if a mismatch is found between the VRF name from the router and the VRF name from the inventory system. If a mismatch is found, activity 3260 can be performed. If no mismatch is found, activity 3280 can be performed. At activity 3260, a technician and/or service entity can be automatically notified to a provisioning error resulting in the mismatch. Certain exemplary embodiments can be adapted to automatically notify a customer service entity, via a trouble ticket if a VRF configuration problem, such as the mismatch, is found. At activity 3280, a ping signal can be initiated from a PE router to a CE router for each VRF link. Certain exemplary embodiments can be adapted to automatically ping each VRF link to check connectivity between each CE router and each PE router.

At activity 3300, a determination can be made if reply signals to the ping signals were received as expected. If the reply signals were received as expected, activity 3320 can be performed. If the reply signals were not received as expected, activity 3340 can be performed. At activity 3320, a trouble ticket associated with method 3000 can be automatically closed. In certain exemplary embodiments, a customer associated with the trouble ticket can be notified that no problem was found on the VRF links. At activity 3340, a determination can be made regarding whether a VRF Link Down alarm was received and/or found. If the VRF Link Down alarm was received and/or found, activity 3360 can be performed. If the VRF Link Down alarm was not received and/or found, activity 3380 can be performed. At activity 3360, a technician and/or service entity can be automatically notified about a potential network configuration problem. At activity 3380, an automatic and/or manual notification can be made to a customer facing agent and/or an entity associated with the customer to conduct additional analyses of the VRF system.

At activity 3400, VRF maximum threshold alerts can be checked. In certain exemplary embodiments, a customer might have contracted for a fixed maximum count of VRF circuits. If that fixed maximum count is exceeded, VRF couplings might not perform in accordance with the desires of the customer. At activity 3420, a determination can be made regarding whether a count of VRF circuits has exceeded the maximum count. If the maximum count has been exceeded, activity 3440 can be performed. If the maximum count has not been exceeded, activity 3460 can be performed. At activity 3440, a customer facing workcenter can be automatically notified about a status of the VRF protocol. Certain exemplary embodiments can be adapted to automatically notify the customer if the customer's VRF circuits have exceeded the maximum count. In certain exemplary embodiments, the trouble ticket can be closed automatically. At activity 3460, the layer three port status can be obtained and/or received. At activity 3480, a determination can be made whether the layer three port is out of service. If the layer three port is out of service, activity 3200 can be performed. If the layer three port is not out of service, activity 3220 can be performed.

Figure 4:
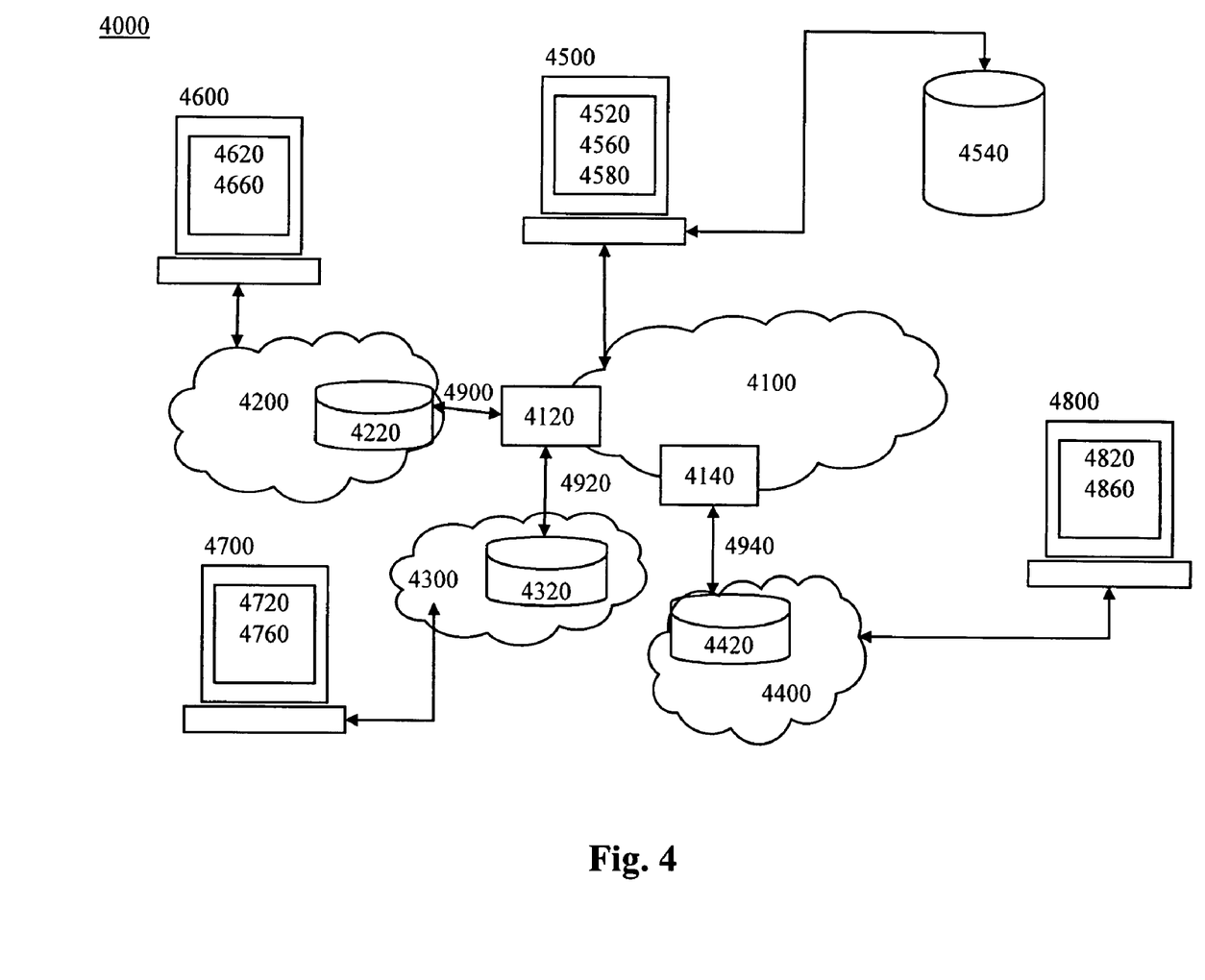
FIG. 4 is a block diagram of an exemplary embodiment of a system 4000.

FIG. 4 is a block diagram of an exemplary embodiment of a system 4000, which can comprise a network 4100. Network 4100 can be a backbone network operated by a service provider. Network 4100 can be communicatively coupled to a first customer network 4200, a second customer network 4300, and/or a third customer network 4400. Network 4100 can be communicatively coupled to first customer network 4200 via a first Provider Edge (PE) router 4120 and/or a first Customer Edge (CE) router 4220. Network 4100 can be communicatively coupled to second customer network 4300 via first PE router 4120 and/or a second CE router 4320. Network 4100 can be communicatively coupled to third customer network 4400 via a second PE router 4140 and/or a third CE router 4420.

System 4000 can be adapted to communicatively couple a plurality of information devices such as a first information device 4600, a second information device 4700, and/or a third information device 4800. First information device 4600, second information device 4700, and/or third information device 4800 can comprise corresponding user programs, such as first user program 4620, second user program 4720, and/or third user program 4820, which can be adapted to transmit signals and/or messages to other information devices via a VPN and/or VRF circuits. First information device 4600, second information device 4700, and/or third information device 4800 can comprise corresponding user interfaces, such as first user interface 4660, second user interface 4760, and third user interface 4860, which can be adapted to render information regarding transmitted signals and/or messages associated with the VPN and/or VRF circuits.

System 4000 can comprise monitoring information device 4500, which can comprise a user program 4520, a user interface 4560, and/or a fault determination processor 4580. User program 4520 can be adapted to monitor and/or analyze VRF faults and/or VRF parameters associated with VRF circuits to determine a cause of VRF performance problems. User interface 4560 can be adapted to render information regarding VRF circuits and/or VRF performance problems. User interface 4560 can be adapted to automatically render information indicative of a cause of a failure. Fault determination processor 4580 can be adapted to automatically determine information indicative of the cause of the failure in a VPN that comprises one or more routers, such as first PE router 4120 and/or second PE router 4140, which can utilize Virtual Routing and Forwarding (VRF) tables to route traffic via the VPN. Fault determination processor 4580 can be adapted to:

- automatically analyze VRF alerts comprising MPLS VRF link up alerts and/or MPLS VRF link down alerts;
- automatically filter out problems related to layer one and/or layer two facilities of the VPN;
- automatically correlate problems to the failure of layer one and/or layer two facilities of the VPN;
- automatically correlate VRF threshold alerts of the VRF alerts to customer edge routers;
- automatically compare a VRF Name obtained from a router, of the one or more routers, with a name in an inventory database;
- automatically report a mismatch between the VRF name and the name in the inventory database;
- automatically check connectivity between a Customer Edge router and a Provider Edge router via a Packet Internet Groper (ping) signal transmitted over a VRF link;
- automatically check a layer three port status of a Provider Edge router of the VPN;
- automatically determine that a layer three port of the VPN is out of service;
- automatically determine that a VRF link of the VPN is out of service based upon a VRF link down trap;
- automatically determine that a count of VRF circuits associated with a customer has exceeded a maximum threshold count of VRF circuits, the customer associated with the VPN;
- automatically report a VRF configuration problem associated with the VPN;
- automatically report problems related to layer one and/or layer two facilities of the VPN;
- automatically notify a customer associated with VRF in the VPN if a count of VRF circuits of the customer exceed a maximum threshold; and/or
- automatically notify a service entity responsive to an automatically determined provisioning error associated with the one or more routers; etc.

Figure 5:
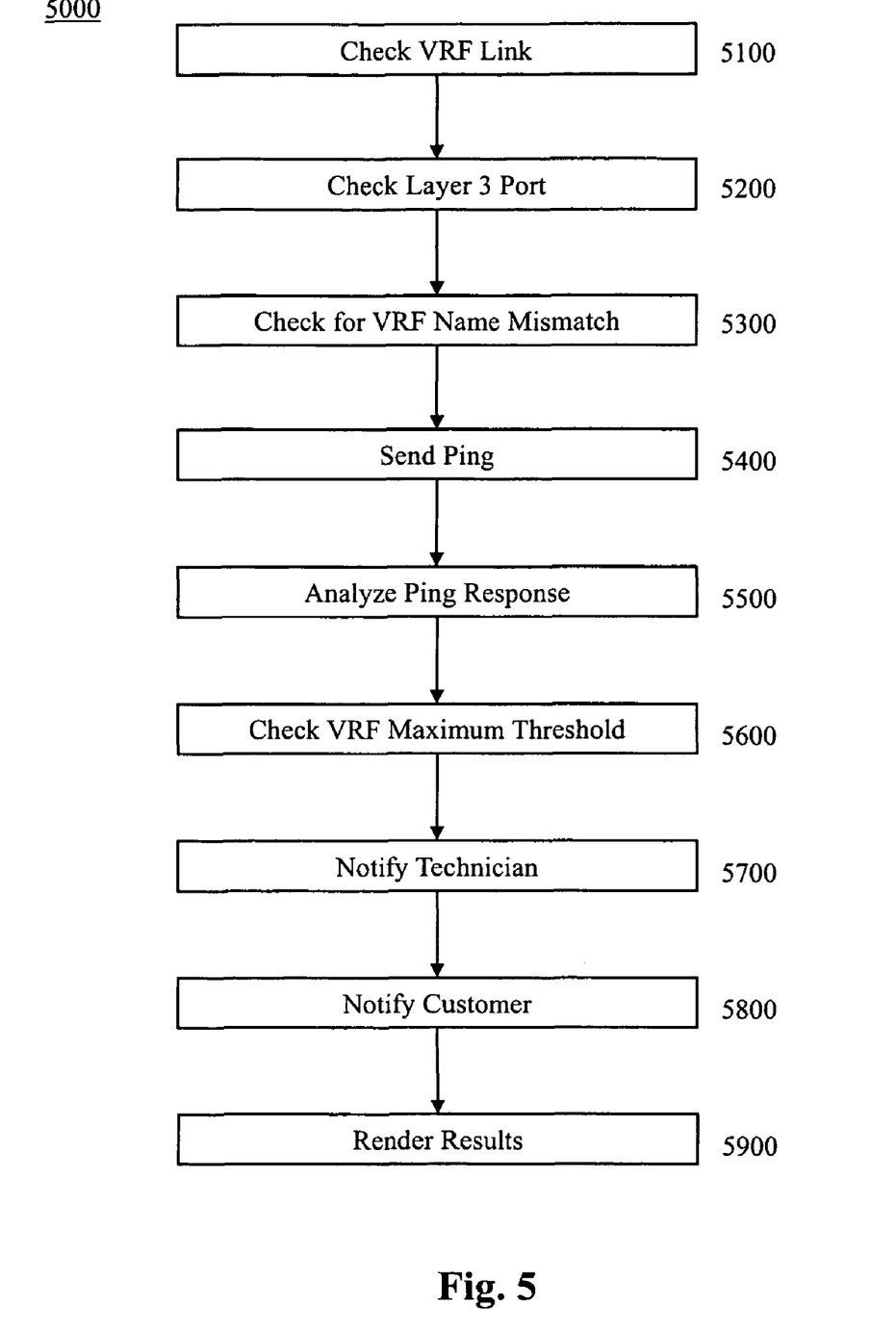
FIG. 5 is a flowchart of an exemplary embodiment of a method 5000.

FIG. 5 is a flowchart of an exemplary embodiment of a method 5000. Activities of method 5000 can be performed manually and/or automatically. Activities of method 5000 can be performed via machine instructions stored on a machine-readable medium and/or executed via an information device. Any subset of activities of method 5000 can be performed via a rules based expert system. In certain exemplary embodiments a communications failure can be experienced in a VPN. The VPN can comprise one or more routers that utilize VRF tables to route traffic via the VPN. The VPN can comprise a plurality of VRF links. At activity 5100, a VRF link status of one or more of the plurality of VRF links can be automatically checked. Certain exemplary embodiments can be adapted to automatically analyze VRF alerts. The VRF alerts can comprise MPLS VRF link up alerts and/or MPLS VRF link down alerts. Certain exemplary embodiments can be adapted to automatically correlate VRF threshold alerts of the VRF alerts to customer edge routers. The rules based expert system can be adapted to identify and/or locate a cause of the failure. The rules based expert system can be adapted to automatically determine that a VRF link of the VPN is out of service based upon a VRF link down trap.

At activity 5200, a layer three port status associated with each VRF link can be checked. Certain exemplary embodiments can be adapted to automatically check the layer three port status of a Provider Edge router of the VPN. Certain exemplary embodiments can be adapted to automatically determine that a layer three port of the VPN is out of service. Certain exemplary embodiments can be adapted to automatically filter out problems related to layer one and layer two facilities of the VPN. Certain exemplary embodiments can be adapted to automatically correlate problems to the failure of layer one and/or layer two facilities of the VPN.

At activity 5300, a check can be made of a VRF name in a VRF routing table to determine if the VRF name matches a corresponding VRF name in an inventory database. The rules based expert system can be adapted to automatically compare the VRF name obtained from a router, of the one or more routers, with a name in the inventory database, the VRF name associated with the VPN. If a mismatch is found, certain exemplary embodiments can be adapted to automatically report a mismatch between the VRF name and the name in the inventory database. The report can be to a service and/or provisioning entity and can be indicative of a provisioning error.

At activity 5400, a ping signal can be sent to one or more devices associated with a VRF route being tested. Certain exemplary embodiments can be adapted to automatically check connectivity between a CE router and a PE router via the ping signal transmitted over a VRF link.

At activity 5500, a response to the ping signal can be received and/or analyzed. A response to the ping signal can be indicative of proper performance of a VRF link and/or the VPN. A lack of response and/or partial response to the ping signal can be indicative of a fault and/or failure of the VRF link and/or the VPN.

At activity 5600, a VRF maximum threshold can be checked and/or compared to an actual number of VRF connections being utilized by a customer associated with the VRF maximum threshold. Responsive to one or more activities of method 5000, the cause of the failure can be automatically determined by the rules based expert system. The rules based expert system can be adapted to automatically determine that a count of VRF circuits associated with a customer has exceeded a maximum threshold count of VRF circuits. The customer can be associated with the VPN.

At activity 5700, a technician can be notified of a problem associated with a VRF communication, such as the identified failure. For example, the technician can be notified if a mismatch is found between the VRF name in the routing table and the VRF name in the inventory database. Certain exemplary embodiments can be adapted to automatically report a VRF configuration problem associated with the VPN. Certain exemplary embodiments can be adapted to automatically report one or more problems related to layer one and/or layer two facilities of the VPN. In certain exemplary embodiments, the rules based expert system can be adapted to automatically notify a service entity responsive to an automatically determined provisioning error associated with the one or more routers.

At activity 5800, a customer can be notified that either a problem associated with the VRF link has been identified or that no problem has been identified. Certain exemplary embodiments can be adapted to automatically notify a customer associated with VRF in the VPN if the count of VRF circuits of the customer exceeds the maximum threshold.

At activity 5900, results can be automatically rendered. Certain exemplary embodiments can be adapted to automatically render information indicative of the cause of the failure in the VPN.

Figure 6:
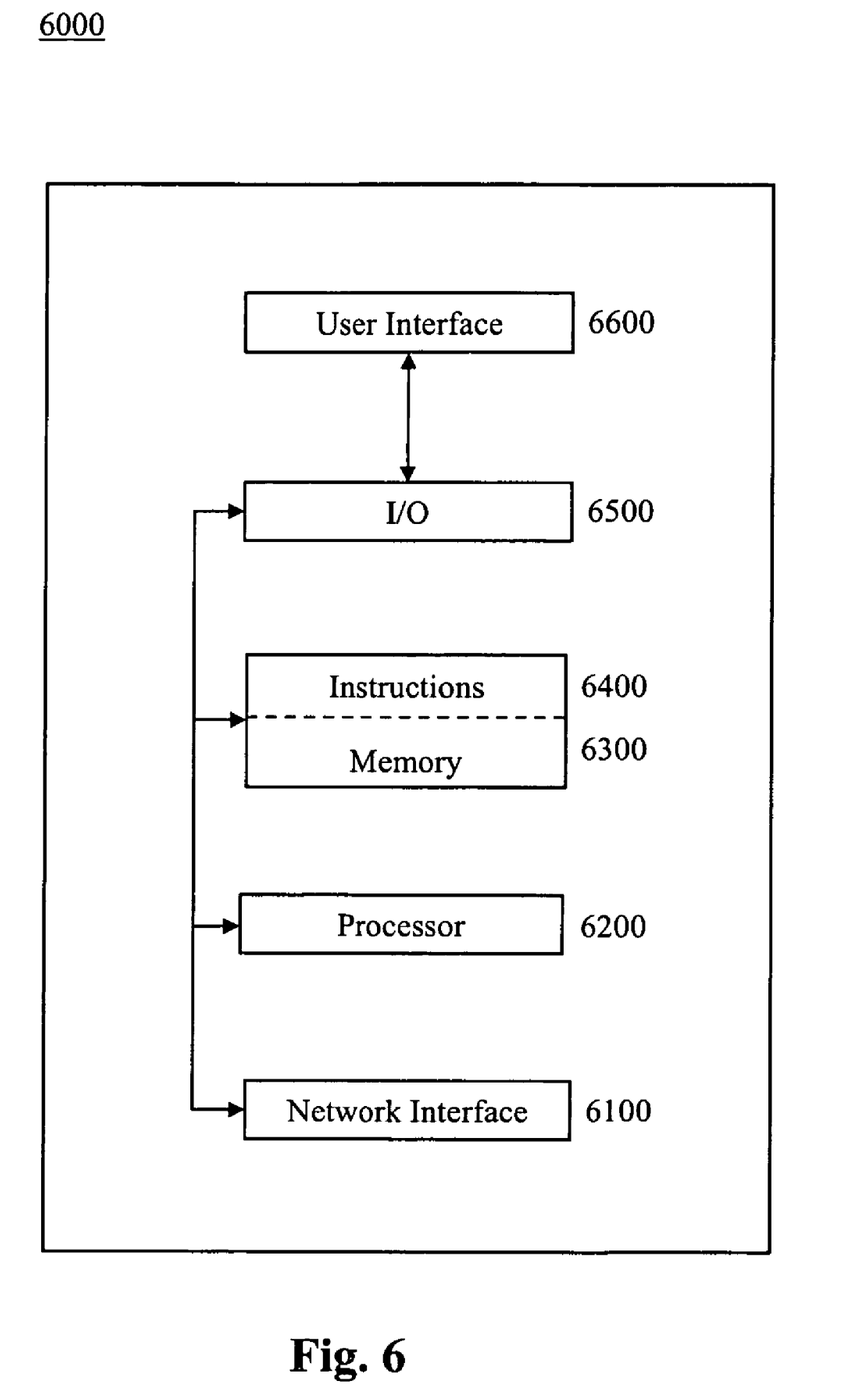
FIG. 6 is a block diagram of an exemplary embodiment of an information device 6000.

FIG. 6 is a block diagram of an exemplary embodiment of an information device 6000, which in certain operative embodiments can comprise, for example first information device 4600, second information device 4700, third information device 4800, and/or monitoring information device 4500 of FIG. 4. Information device 6000 can comprise any of numerous components, such as for example, one or more network interfaces 6100, one or more processors 6200, one or more memories 6300 containing instructions 6400, one or more input/output (I/O) devices 6500, and/or one or more user interfaces 6600 coupled to I/O device 6500, etc.

In certain exemplary embodiments, via one or more user interfaces 6600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

As used herein, the term a means at least one. As used herein, the term access means (n) a permission, liberty, right, mechanism, or ability to enter, approach, communicate with and/or through, make use of, and/or pass to and/or from a place, thing, and/or person. (v) to enter, approach, communicate with and/or through, make use of, and/or pass to and/or from. As used herein, the term activity means an action, act, deed, function, step, and/or process and/or a portion thereof. As used herein, the term adapted to means suitable, fit, and/or capable of performing a specified function. As used herein, the term add means to combine. As used herein, the term address means (n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network. As used herein, the term adjust means to change so as to match, fit, adapt, conform, and/or be in a more effective state. As used herein, the term alert means a warning signal. As used herein, the term all means every one of a set. As used herein, the term allow means to provide, let do, happen, and/or permit. As used herein, the term analyze means to review, study, examine, evaluate, and/or consider in detail and/or to subject to an analysis in order to discover essential features and/or meaning. As used herein, the term and/or means either in conjunction with or in alternative to.

As used herein, the term apparatus means an appliance or device for a particular purpose. As used herein, the term approximately means about and/or nearly the same as. As used herein, the term assist means to give help or support to. As used herein, the term associate means to join, connect together, and/or relate. As used herein, the term associated with means related to. As used herein, the term at least means not less than. As used herein, the term automatic means performed via an information device in a manner essentially independent of influence and/or control by a user. As used herein, the term automatically means acting and/or operating in a manner essentially independent of external human influence and/or control. For example, an automatic light switch can turn on upon "seeing" a person in its view, without the person manually operating the light switch. As used herein, the term backbone network means a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network. As used herein, the term based means being derived from. As used herein, the term based upon means determined in consideration of and/or derived from. As used herein, the term begin means to start. As used herein, the term between means in a separating interval and/or intermediate to.

As used herein, the term can means is capable of, in at least some embodiments. As used herein, the term cause means to bring about, provoke, precipitate, produce, elicit, be the reason for, result in, and/or effect. As used herein, the term check means to inspect and/or test. As used herein, the term circuit means an electrically conductive pathway and/or a communications connection established across two or more switching devices comprised by a network and between corresponding end systems connected to, but not comprised by the network. As used herein, the term communicate means to exchange information. As used herein, the term communication means a transmission and/or exchange of information. As used herein, the term communications link means an established communication channel. As used herein, the term communicatively means linking in a manner that facilitates communications. As used herein, the term communicatively couple means to link in a manner that facilitates communications. As used herein, the term compare means to examine in order to note similarities or differences between at least two items. As used herein, the term comprise means to include but not be limited to. As used herein, the term comprised by means included by. As used herein, the term configure means to make suitable or fit for a specific use or situation. As used herein, the term configuration means a physical, logical, and/or logistical arrangement of elements. As used herein, the term connectivity means an ability to make and maintain a connection between two or more information devices in a network.

As used herein, the term convert means to transform, adapt, and/or change. As used herein, the term correlate means to determine, identify, put, or bring into a causal, complementary, parallel, and/or reciprocal relation. As used herein, the term count means (n.) a number reached by counting and/or a defined quantity. (v.) to increment, typically by one and beginning at zero. As used herein, the term couple means to join, connect, and/or link two things together. As used herein, the term create means to bring into being. As used herein, the term Customer Edge router means a router in a customer network communicatively coupled to a Provider Edge router. As used herein, the term data means information represented in a form suitable for processing by an information device. As used herein, the term database means one or more structured sets of persistent data, usually associated with software to update and query the data. A simple database might be a single electronic file containing many records, each of which is structured using the same set of fields. As used herein, the term associated means related to and/or accompanying. As used herein, the term data means distinct pieces of information, usually formatted in a special or predetermined way and/or organized to express concepts.

As used herein, the term data structure means an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector. As used herein, the term define means to establish the meaning, relationship, outline, form, and/or structure of, and/or to precisely and/or distinctly describe and/or specify. As used herein, the term detect means to sense, perceive, identify, discover, ascertain, respond to, and/or receive the existence, presence, and/or fact of. As used herein, the term determine means to obtain, calculate, decide, deduce, establish, and/or ascertain. As used herein, the term determination means (n) a decision; (v) to make and/or arrive at a decision. As used herein, the term device means a machine, manufacture, and/or collection thereof.

As used herein, the term directly means without anything intervening. As used herein, the term dynamically means on demand or as necessary. As used herein, the term each means every one of a group considered individually. As used herein, the term either means one or the other of two. As used herein, the term enter means to come and/or flow into. As used herein, the term entity means something that exists as a particular and discrete unit. As used herein, the term error means an unintended result of a signal transmission. As used herein, the term establish means to create, form, and/or set-up. As used herein, the term event means an occurrence. As used herein, the term exceed means to be greater than. As used herein, the term facility means hardware, firmware, and/or software that performs a particular function. As used herein, the term fail means to cease proper functioning and/or performance. As used herein, the term failure means a cessation of proper functioning or performance. As used herein, the term fault means an undesired and/or dysfunctional system state and/or an imperfection, defect, error, and/or discrepancy. As used herein, the term filtering out means a technique for eliminating undesired data, such as statistical outliers, irrelevant time periods, etc. As used herein, the term for means with a purpose of. As used herein, the term from means used to indicate a source. As used herein, the term further means in addition. As used herein, the term generate means to create, produce, give rise to, and/or bring into existence.

As used herein, the term haptic means involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity. As used herein, the term if means in case that. As used herein, the term indicative means serving to indicate. As used herein, the term information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

As used herein, the term information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc. As used herein, the term input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term interface means (n) an addressable device for communicatively coupling an entity (such as a router, server, switch, softswitch, gateway, etc.) to a packet network, the addressable device comprising hardware, firmware, and/or software, etc. The entity can have multiple interfaces, each of which can be addressable via one or more packet networks. (v) to connect with and/or interact with by way of an interface. As used herein, the term Internet Protocol (IP) means a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time. As used herein, the term inventory means a listing of identifiers. As used herein, the term layer three means a layer in the OSI model that provides switching and/or routing. For example, the network layer can provide logical paths, known as virtual circuits, for transmitting data from node to node. Functions of this layer can include routing, forwarding, addressing, internetworking, error handling, congestion control, and/or packet sequencing.

As used herein, the term link means a physical and/or logical communication channel between a pair of switching and/or routing devices; and/or an activatable connection to another web page, location in a web page, file, and/or other Internet resource. As used herein, the term link up alert means an alert indicative that a link is functional. As used herein, the term link down alert means an alert indicative that a link is non-functional. As used herein, the term located means situated in a particular spot and/or position. As used herein, the term machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the term machine-readable medium means a physical structure from which a machine, such as an information device, computer, microprocessor, and/or controller, etc., can obtain and/or store data, information, and/or instructions. Examples include memories, punch cards, and/or optically readable forms, etc.

As used herein, the term make means to create, generate, and/or form. As used herein, the term maximum means a greatest allowed extent. As used herein, the term may means is allowed and/or permitted to, in at least some embodiments. As used herein, the term memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. As used herein, the term message means a communication. As used herein, the term method means a process, procedure, and/or collection of related activities for accomplishing something. As used herein, the term mismatch means two substantially non-identical objects. As used herein, the term more means greater in size, amount, extent, and/or degree.

As used herein, the term Multi-Protocol Label Switching (MPLS) means a technology wherein labels are established in each packet so as to indicate a destination of each packet. Routers can switch such packets via the label. As used herein, the term name means a sequence of one or more characters that uniquely identifies and/or distinguishes an entity. As used herein, the term network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

As used herein, the term network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein, the term network node means an information device coupled to a network. As used herein, the term non means not. As used herein, the term not means a negation of something. As used herein, the term notify means to advise and/or remind. As used herein, the term obtain means to receive, get, take possession of, procure, acquire, calculate, determine, and/or compute. As used herein, the term occur means to take place. As used herein, the term one means a single entity.

As used herein, the term Open Systems Interconnection (OSI) reference model means a general functional model for computer and/or data network architecture developed by the International Standards Organization (ISO). The OSI model can be useful as a framework for international standards in heterogeneous computer network architecture. The OSI model can be logically partitioned into seven layers, namely, from lowest to highest: 1) physical layer, 2) data link layer, 3) network layer, 4) transport layer, 5) session layer, 6) presentation layer, 7) application layer. Functional equivalents to these layers are considered included in this definition. As used herein, the term over means with reference to. As used herein, the term packet means a generic term for a bundle of data organized in a specific way for transmission, such as within and/or across a network, such as a digital packet-switching network, and comprising the data to be transmitted and certain control information, such as a destination address.

As used herein, the term Packet Internet Groper (ping) signal means a packet sent to the specific IP address that requests a reply to determine whether a specific IP address is accessible. As used herein, the term perform means to begin, take action, do, fulfill, accomplish, carry out, and/or complete, such as in accordance with one or more criterion. As used herein, the term plurality means the state of being plural and/or more than one. As used herein, the term port means hardware, firmware, and/or software adapted to communicatively couple a first device with a second device. As used herein, the term predetermined means established in advance. As used herein, the term problem means a source of difficulty regarding a communicative coupling in a network.

As used herein, the term processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

As used herein, the term provide means to furnish, supply, give, convey, send, and/or make available. As used herein, the term provision means to configure and/or activate a network device. As used herein, the term Provider Edge router means a device in a Provider network communicatively coupled to a device in a Customer network. As used herein, the term receive means to gather, take, acquire, obtain, accept, get, and/or have bestowed upon. As used herein, the term regarding means pertaining to. As used herein, the term related means connected to and/or associated with. As used herein, the term render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc. As used herein, the term repeatedly means again and again; repetitively.

As used herein, the term report means a presentation of information in a predetermined format. As used herein, the term request means (v.) to express a need and/or desire for; to inquire and/or ask for (n.) that which communicates an expression of desire and/or that which is asked for. As used herein, the term responsive means reacting to an influence and/or impetus. As used herein, the term route means (n) a path along which information, such as packets, can be sent; (v) to select a network path for a message. As used herein, the term router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model.

As used herein, the term rules based expert system means machine instructions that comprise subject-specific knowledge embodied in relations, such as relations held between conditions and conclusions, the machine instructions embody knowledge and/or analytical skills of one or more human experts. As used herein, the term said means when used in a system or device claim, an article indicating a subsequent claim term that has been previously introduced. As used herein, the term select means to make a choice or selection from alternatives. As used herein, the term selected means a chosen item. As used herein, the term send means to convey.

As used herein, the term server means an information device and/or a process running thereon that is adapted to be communicatively coupled to a network and that is adapted to provide at least one service for at least one other information device communicatively coupled to the network and/or for at least one process running on the other information device. A common example is a file server, which has a local disk and services requests from remote clients to read and write files on that disk. A server can also provide access to resources, such as programs, shared devices, etc. As used herein, the term service means a performance of work, activities, and/or duties.

As used herein, the term signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

As used herein, the term status means a state and/or condition and/or information related thereto. As used herein, the term store means to place, hold, retain, enter, and/or copy into and/or onto a machine-readable medium. As used herein, the term substantially means to a considerable, large, and/or great, but not necessarily whole and/or entire, extent and/or degree. As used herein, the term system means a collection of mechanisms, devices, data, and/or instructions, the collection designed to perform one or more specific functions. As used herein, the term thereby means because of. As used herein, the term threshold means a point that when exceeded produces a given effect or result. As used herein, the term traffic means a flow of bits, packets, datagrams, calls, and/or messages. As used herein, the term transmission means an electronic communication of a message. As used herein, the term transmit means to provide, furnish, supply, send as a signal, and/or to convey (e.g., force, energy, and/or information) from one place and/or thing to another. As used herein, the term trap means an interrupt caused by one or more predetermined conditions. As used herein, the term two means one plus one. As used herein, the term resource means something used for support or help. As used herein, the term unique means not identical to any other. As used herein, the term used means employed for a purpose.

As used herein, the term user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc. As used herein, the term utilize means to use and/or put into service.

As used herein, the term via means by way of and/or utilizing. As used herein, the term Virtual Private Network (VPN) means a plurality of information devices that are communicatively coupled via encrypted communication tunnels over a public network, such as the global Internet. As used herein, the term Virtual Routing and Forwarding (VRF) tables means a plurality of electronic files and/or database type objects that co-exist concurrently within a router. Each of the plurality of electronic files and/or database type objects is associated with one or more VPNs. The electronic files and/or database type objects store routes and/or metrics associated with routes to particular network destinations. As used herein, the term wherein means in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:
   automatically rendering information indicative of a cause of a failure in a Virtual Private Network (VPN) that comprises at least one or more router that utilizes Virtual Routing and Forwarding (VRF) tables to route traffic via the VPN, the cause of the failure automatically determined by a rules based expert system configured to:
   automatically analyze VRF alerts comprising Multi-Protocol Label Switching (MPLS) VRF link up alerts and MPLS VRF link down alerts;
   automatically correlate VRF threshold alerts of the VRF alerts to customer edge routers; and
   automatically determining that a count of VRF circuits associated with a customer has exceeded a maximum threshold count of VRF circuits, the customer associated with the VPN.

2. The method of claim 1, further comprising:
   automatically analyzing the VRF alerts.

3. The method of claim 1, further comprising:
   automatically correlating the VRF alerts to customer edge routers.

4. The method of claim 1, further comprising:
automatically comparing a VRF name obtained from a router, of the at least one router, with a name in an inventory database, the VRF name associated with the VPN.

5. The method of claim 1, further comprising:
automatically comparing a VRF name obtained from a router, of the at least one router, with a name in an inventory database, the VRF name associated with the VPN; and
automatically reporting a mismatch between the VRF name and the name in the inventory database.

6. The method of claim 1, further comprising:
automatically checking connectivity between a Customer Edge router and a Provider Edge router via a Packet Internet Groper (ping) signal transmitted over a VRF link.

7. The method of claim 1, further comprising:
automatically checking a layer three port status of a Provider Edge router of the VPN.

8. The method of claim 1, further comprising:
automatically filtering out problems related to layer one and layer two facilities of the VPN.

9. The method of claim 1, further comprising:
automatically correlating problems to the failure of layer one and/or layer two facilities of the VPN.

10. The method of claim 1, further comprising:
automatically reporting a VRF configuration problem associated with the VPN.

11. The method of claim 1, further comprising:
automatically reporting problems related to layer one and layer two facilities of the VPN.

12. The method of claim 1, further comprising:
automatically notifying a customer associated with VRF in the VPN if a count of VRF circuits of the customer exceeds a maximum threshold.

13. The method of claim 1, further comprising:
automatically determining that a VRF link of the VPN is out of service based upon a VRF link down trap.

14. The method of claim 1, further comprising:
automatically determining that a layer three port of the VPN is out of service.

15. The method of claim 1, further comprising:
automatically notifying a service entity responsive to an automatically determined provisioning error associated with the at least one router.

16. A non-transitory computer-readable medium encoded with computer executable instructions for activities comprising:
automatically rendering information indicative of a cause of a failure in a Virtual Private Network (VPN) that comprises at least one router that utilizes Virtual Routing and Forwarding (VRF) tables to route traffic via the VPN, the cause of the failure automatically determined by a rules based expert system configured to:
automatically compare a VRF Name obtained from a router, of the at least one router, with a name in an inventory database;
automatically check connectivity between a Customer Edge router and a Provider Edge router via a Packet Internet Groper (ping) signal transmitted over a VRF link: and
automatically determining that a count of VRF circuits associated with a customer has exceeded a maximum threshold count of VRF circuits, the customer associated with the VPN.

17. A method comprising:
automatically rendering information indicative of a cause of a failure in a Virtual Private Network (VPN) that comprises at least one router that utilizes Virtual Routing and Forwarding (VRF) tables to route traffic via the VPN, the cause of the failure automatically determined by a rules based expert system configured to:
automatically check a layer three port status of the VPN; and
automatically report problems related to layer one and layer two facilities of the VPN; and
automatically determining that a count of VRF circuits associated with a customer has exceeded a maximum threshold count of VRF circuits, the customer associated with the VPN.

18. A method comprising:
automatically rendering information indicative of a cause of a failure in a Virtual Private Network (VPN) that comprises at least one router that utilizes Virtual Routing and Forwarding (VRF) tables to route traffic via the VPN, the cause of the failure automatically determined by a rules based expert system configured to:
automatically report a VRF configuration problem; and
automatically determining that a count of VRF circuits associated with a customer has exceeded a maximum threshold count of VRF circuits, the customer associated with the VRF;
automatically notify the customer associated with the VRF if a count of VRF circuits of the customer exceeds a maximum threshold.

19. A system comprising:
a fault determination processor configured to automatically determine information indicative of a cause of a failure in a Virtual Private Network (VPN) that comprises at least one router that utilizes Virtual Routing and Forwarding (VRF) tables to route traffic via the VPN, fault determination processor configured to:
automatically analyze VRF alerts comprising Multi-Protocol Label Switching (MPLS) VRF link up alerts and MPLS VRF link down alerts; and
automatically compare a VRF Name obtained from a router, of the at least one router, with a name in an inventory database;
automatically determining that a count of VRF circuits associated with a customer has exceeded a maximum threshold count of VRF circuits, the customer associated with the VPN; and
a user interface adapted configured to automatically render the information indicative of the cause of the failure.

* * * * *